US010509503B2

(12) United States Patent
Hwang et al.

(10) Patent No.: US 10,509,503 B2
(45) Date of Patent: Dec. 17, 2019

(54) DISPLAY DEVICE AND METHOD OF DRIVING THE SAME

(71) Applicant: LG Display Co., Ltd., Seoul (KR)

(72) Inventors: Jonghee Hwang, Goyang-si (KR); Buyeol Lee, Goyang-si (KR); Junseok Oh, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/101,787

(22) Filed: Aug. 13, 2018

(65) Prior Publication Data
US 2019/0129556 A1    May 2, 2019

(30) Foreign Application Priority Data
Oct. 31, 2017    (KR) .................. 10-2017-0144120

(51) Int. Cl.
G06F 3/041    (2006.01)
G06F 3/045    (2006.01)
G06F 3/044    (2006.01)

(52) U.S. Cl.
CPC ............ *G06F 3/0414* (2013.01); *G06F 3/044* (2013.01); *G06F 3/045* (2013.01); *G06F 3/04166* (2019.05); *G06F 3/04144* (2019.05); *G06F 3/041661* (2019.05); *G06F 2203/04105* (2013.01); *G06F 2203/04112* (2013.01)

(58) Field of Classification Search
None
See application file for complete search history.

(56) References Cited

U.S. PATENT DOCUMENTS

| 2018/0059865 | A1* | 3/2018 | Qu ........................ G06F 3/0416 |
| 2018/0059866 | A1* | 3/2018 | Drake ................... G06F 3/0416 |
| 2018/0234624 | A1* | 8/2018 | Lee ........................ G06F 3/0488 |
| 2019/0064998 | A1* | 2/2019 | Chowdhury .......... G06F 3/0418 |

* cited by examiner

Primary Examiner — Christopher J Kohlman
(74) Attorney, Agent, or Firm — Morgan, Lewis & Bockius LLP

(57) ABSTRACT

A method of driving a display device includes: sensing a touch signal from a plurality of touch electrodes in a touch panel, sensing a force signal from a force sensor, based on the sensed touch signal, determining whether or not the touch panel is in a submerged state, when the touch panel is determined to be in the submerged state, increasing sensing periods of the touch signal and the force signal, detecting a baseline variation of the force sensor, based on the detected baseline variation, changing a sensing reference value of the force sensor, based on the increasing the sensing periods, sensing the force signal equal to or greater to the changed sensing reference value through the force sensor, and when the force signal equal to or greater to the changed sensing reference value is sensed through the force sensor, decreasing the sensing periods.

19 Claims, 13 Drawing Sheets

DISPLAY DEVICE AND METHOD OF DRIVING THE SAME

CROSS-REFERENCE TO RELATED APPLICATION(S)

This application claims the benefit of and priority to Korean Patent Application No. 10-2017-0144120, filed on Oct. 31, 2017, the entirety of which is hereby incorporated by reference.

BACKGROUND

1. Technical Field

The present disclosure relates to a display device and a method of driving the same, and more particularly, to a display device to control sensing operations of a touch and a touch force depending on whether or not a touch panel is submerged, and a method of driving the same.

2. Discussion of the Related Art

The touch panel is provided in a display device, such as a liquid crystal display (LCD), a field emission display (FED), a plasma display panel (PDP), an electroluminescent display (ELD), and an electrophoretic display (EPD), and is a type of an input device that allows a user to directly touch a screen with a finger or a pen and input information while viewing the display device. The touch panel is classified into various types according to a touch sensing method. Recently, a capacitive touch panel, which has a simple structure, a low cost, and can be manufactured in a thin and light-weight form, has been mainly used for miniaturization of the display device. The capacitive touch panel may sense a touch by sensing a capacitance variation according to a user's touch.

In addition, a recent display device is provided with a force sensor that senses a touch force of the user, separately from the above-described touch panel. Accordingly, the touch panel can recognize two-dimensional touch coordinates, and the force sensor can recognize the strength of a three-dimensional touch.

Recently, a waterproof function has been applied to a display device, such as a mobile terminal, so that a user can carry the display device under water, and the display device may be submerged accordingly. However, because the capacitive touch panel senses a capacitance variation to perform a touch sensing operation, the touch of the user cannot be distinguished from the contact of the water. As a result, the display device may perform an operation that is not intended by the user, and malfunctions may occur in hardware and software.

That is, although a related art display device cannot perform a touch sensing operation under water, the touch sensing operation is continuously performed, thereby causing a malfunction of the display device and unnecessary waste of power. Also, the related art display device provides only a waterproof function, but does not provide any interface that can be operated by the user under water. Therefore, the user's convenience is very low.

SUMMARY

Accordingly, the present disclosure is directed to a display device to control sensing periods of a touch and a touch force depending on whether or not a touch panel is submerged, and a method of driving the same that substantially obviates one or more of the issues due to limitations and disadvantages of the related art.

An aspect of the disclosure is to provide a display device to change a sensing reference value of a force sensor when the touch panel is submerged, and a method of driving the same.

Another aspect of the disclosure is to provide a display device to decrease the sensing periods of the touch and the touch force when the touch force of a user is applied to the submerged touch panel, and a method of driving the same.

Another aspect of the disclosure is to provide a display device to receive the touch force of the user by grouping areas of the touch panel when the touch panel is submerged, and a method of driving the same.

Another aspect of the disclosure is to provide a display device to perform a particular operation according to an input of the user, even when the touch panel is submerged, and a method of driving the same.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts as embodied and broadly described, there is provided a method of driving a display device, the method including: sensing a touch signal from a plurality of touch electrodes in a touch panel, sensing a force signal from a force sensor, based on the sensed touch signal, determining whether or not the touch panel is in a submerged state, when the touch panel is determined to be in the submerged state, increasing sensing periods of the touch signal and the force signal, detecting a baseline variation of the force sensor, based on the detected baseline variation, changing a sensing reference value of the force sensor, based on the increasing the sensing periods, sensing the force signal equal to or greater to the changed sensing reference value through the force sensor, and when the force signal equal to or greater to the changed sensing reference value is sensed through the force sensor, decreasing the sensing periods.

In another aspect, there is provided a display device, including: a display panel including a plurality of pixels, each pixel being in an area where a gate line and a data line intersect each other, a touch panel including a plurality of touch electrodes, each configured to sense a touch signal, a force sensor configured to sense a force signal, a driving integrated circuit (IC) configured to drive the display panel, and a touch IC configured to: determine whether or not the touch panel is in a submerged state, based on the touch signal received from the touch panel, when the touch panel is in a submerged state, increase sensing periods of the touch signal and the force signal, detect a baseline variation of the force sensor, change a sensing reference value of the force sensor based on the detected baseline variation, and when the force signal equal to or greater than the changed sensing reference value is sensed, decrease the sensing periods.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with embodiments of the disclosure. It is to be understood that both the foregoing general description and the following detailed description of the present disclosure are examples and explanatory, and are intended to provide further explanation of the disclosure as claimed.

BRIEF DESCRIPTION OF THE DRAWINGS

The accompanying drawings, that may be included to provide a further understanding of the disclosure and are incorporated in and constitute a part of this specification, illustrate embodiments of the disclosure and together with the description serve to explain various principles of the disclosure.

Figure 1:
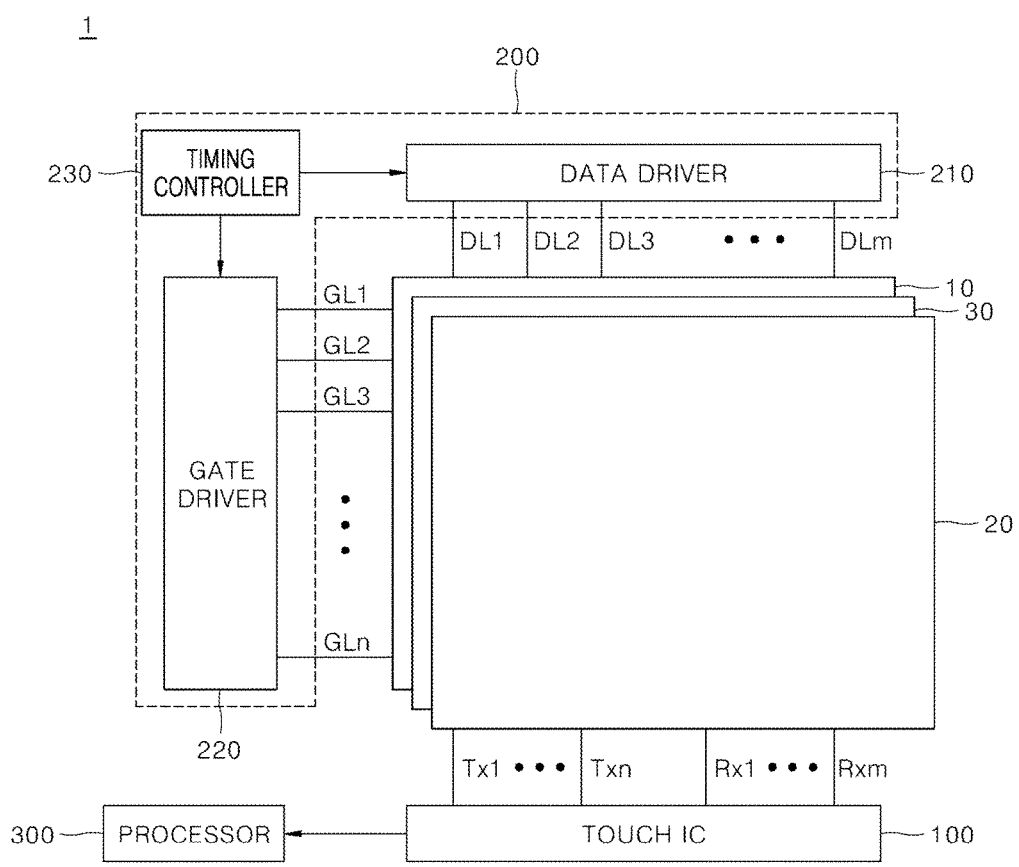
FIG. 1 illustrates a display device according to an embodiment.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present disclosure, examples of which may be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations are selected only for convenience of writing the specification and may be thus different from those used in actual products.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

In the description of embodiments, when a structure is described as being positioned "on or above" or "under or below" another structure, this description should be construed as including a case in which the structures contact each other as well as a case in which a third structure is disposed therebetween. The size and thickness of each element shown in the drawings are given merely for the convenience of description, and embodiments of the present disclosure are not limited thereto.

Features of various embodiments of the present disclosure may be partially or overall coupled to or combined with each other, and may be variously inter-operated with each other and driven technically as those skilled in the art can sufficiently understand. Embodiments of the present disclosure may be carried out independently from each other, or may be carried out together in co-dependent relationship.

Hereinafter, a display apparatus according to an embodiment of the present disclosure will be described in detail with reference to the accompanying drawings. In adding reference numerals to elements of each of the drawings, although the same elements are illustrated in other drawings, like reference numerals may refer to like elements.

Figure 2:
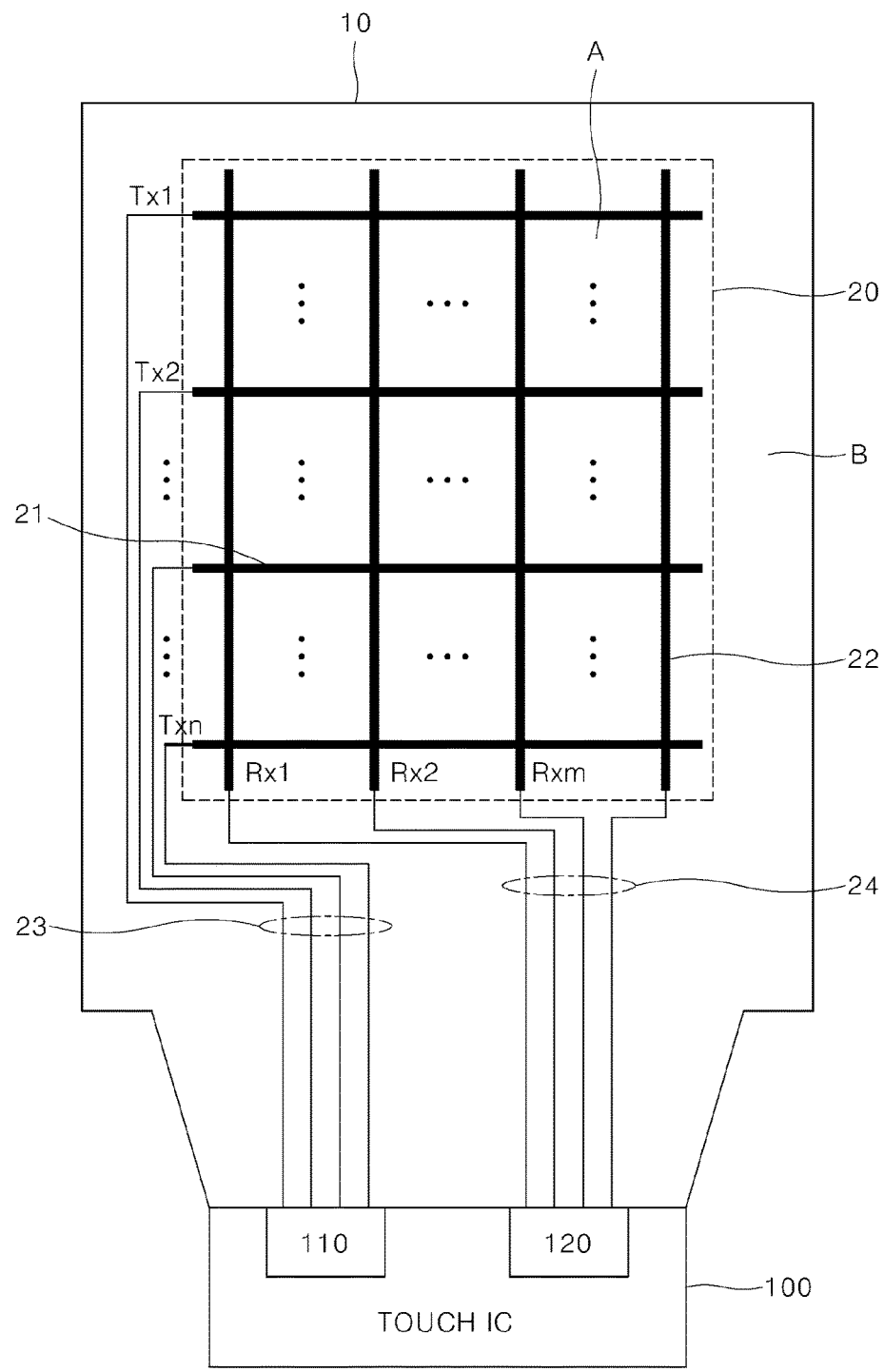
FIGS. 2 and 3 illustrates examples of a touch electrode included in a touch panel illustrated in FIG. 1.
Figure 3:
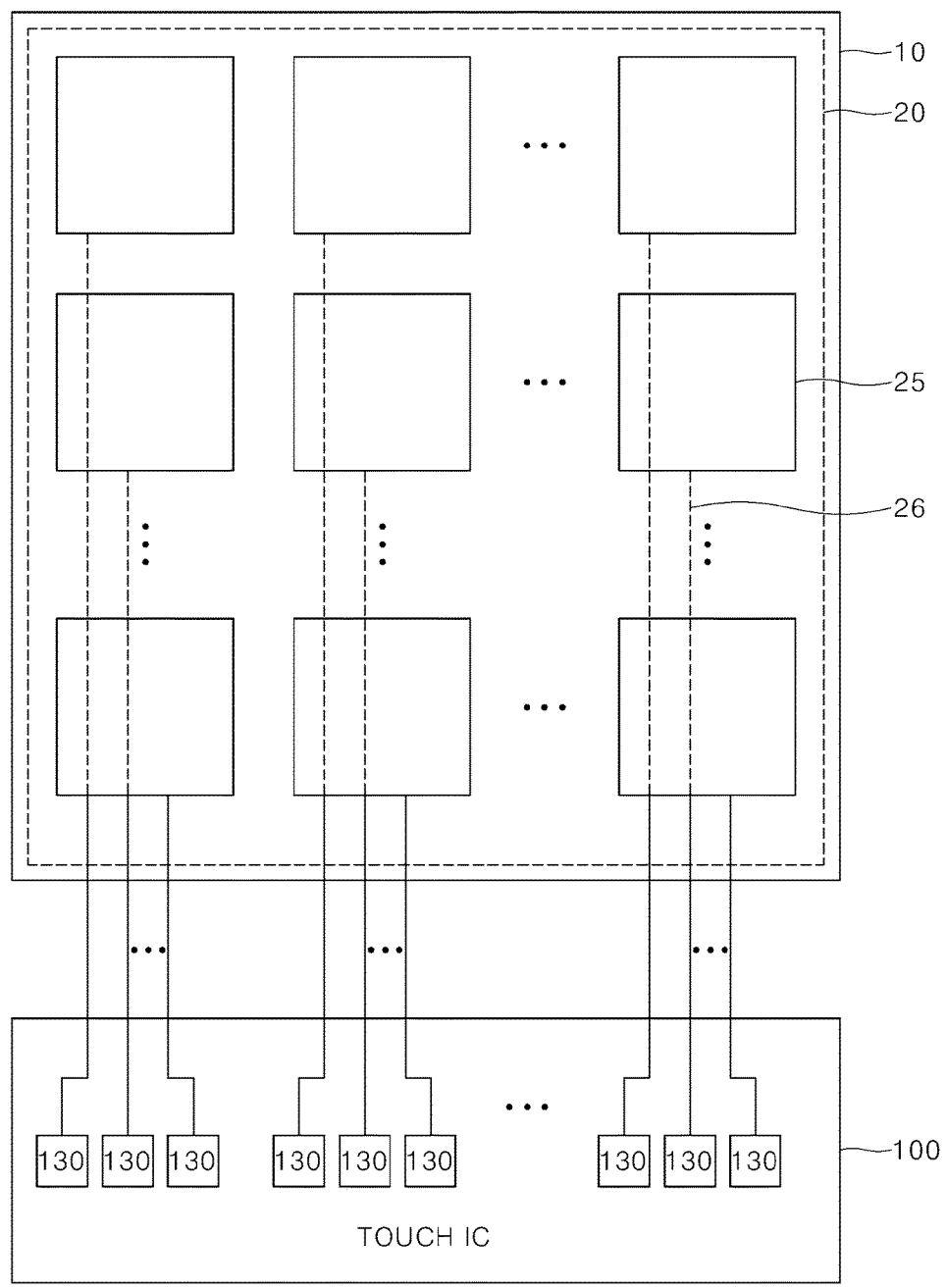
Figure 4:
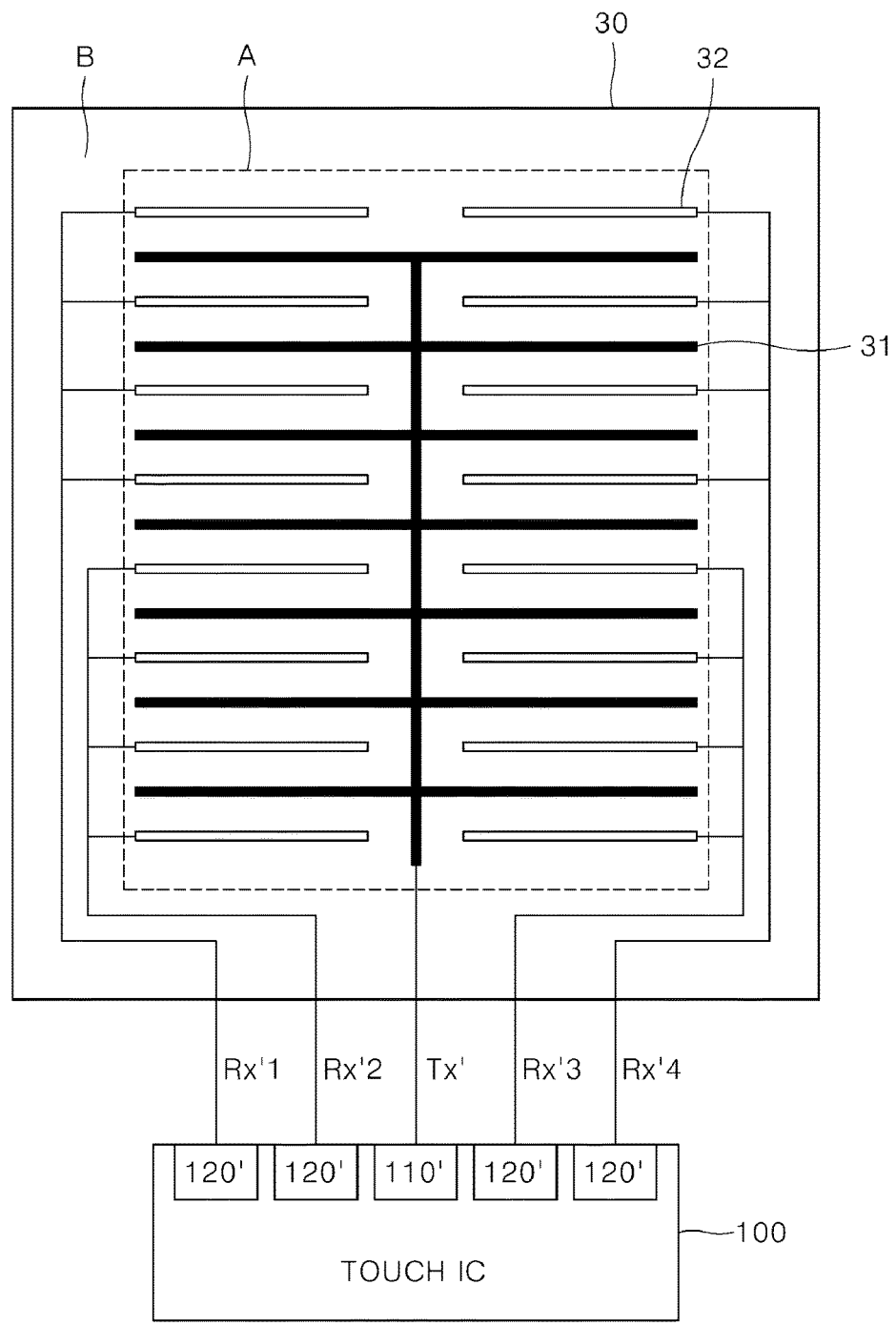
FIG. 4 illustrates an example of a force electrode included in a force sensor illustrated in FIG. 1.

FIG. 1 illustrates a display device according to an embodiment. FIGS. 2 and 3 illustrate examples of a touch electrode included in a touch panel illustrated in FIG. 1. FIG. 4 illustrates an example of a force electrode included in a force sensor illustrated in FIG. 1.

Hereinafter, a display device 1 according to an embodiment and a touch panel 20 in the display device 1 will be described in detail with reference to FIGS. 1 to 4. With reference to FIG. 1, the display device 1 according to an embodiment may include a display panel 10, a touch panel 20, a force sensor 30, a driving integrated circuit (IC) 200, a touch IC 100, and a processor 300. Although the display device 1 illustrated in FIG. 1 is in accordance with an embodiment, elements thereof are not limited to the example embodiment illustrated in FIG. 1, and some elements may be added, changed or deleted, as desired.

First, as illustrated in FIG. 1, the display panel 10 may include gate lines GL1 to GLn and data lines DL1 to DLm, and pixels provided in areas where the gate lines GL1 to GLn and the data lines DL1 to DLm intersect each other, respectively. In one example, when the display panel 10 is a liquid crystal panel, a lower substrate (e.g., a thin film transistor (TFT) substrate) of the display panel 10 may include data lines, gate lines that intersect the data lines, and a plurality TFTs provided in areas in which the gate lines and the data lines intersect each other, respectively.

Also, the lower substrate of the display panel 10 may be provided with a plurality of pixel electrodes to charge a data voltage to the pixels, and a common electrode to drive a liquid crystal based on the data voltage charged to the pixel electrodes. The pixels may be arranged in a matrix shape by a structure in which the data lines and gate lines intersect each other. An upper substrate (e.g., a color filter substrate) of the display panel 10 may be provided with a black matrix (BM) and a color filter (CF). In another example, when the display panel 10 is an organic light-emitting display panel, the display panel 10 may include data lines, gate lines that intersect the data lines, and pixels provided in areas in which the data lines and the gate lines intersect each other to display an image, respectively.

Each pixel may be connected to the data line and the gate line, and may include a switching transistor, a driving transistor, a capacitor, and an organic light-emitting diode (OLED). The switching transistor may perform a switching operation in response to a scan signal supplied through the gate line so that a data voltage supplied through the data line may be stored in the capacitor.

The driving transistor may perform a switching operation so that driving current flows between a first power supply line Vdd (not illustrated) and a second power supply line Vss (not illustrated) according to the data voltage stored in the capacitor. The OLED may emit light according to the driving current formed by the driving transistor.

The display panel 10 according to embodiments may include various panels used in the relevant technical field in addition to the above-described liquid crystal display panel and organic light-emitting display panel. The display panel 10 may be divided into a display area A to output an image, and a non-display area B provided outside the display area A to output no image, e.g., a bezel.

Next, the touch panel 20 may include a plurality of touch electrodes, and the touch panel 20 may perform a function of sensing a touch signal of a user based on the plurality of touch electrode. For example, the touch signal may be generated by a touch of the user, and the touch may be a motion in which the user touches the display panel 10 with a pointer (for example, a finger, a pen, and the like). The touch panel 20 may be a capacitive touch panel using a mutual capacitive method as illustrated in FIG. 2, or may be a capacitive touch panel using a self-capacitive method as illustrated in FIG. 3

With reference to FIG. 2, the touch panel 20 using a mutual capacitive method may include a driving electrode 21, e.g., connected to touch transmission lines Tx1 to Txn, and a receiving electrode 22, e.g., connected to touch reception lines Rx1 to Rxm, in the display area A, and a driving electrode wiring 23 and a receiving electrode wiring 24 in the non-display area B. The driving electrode wiring 23 and the receiving electrode wiring 24 may be in the non-display area B to connect the driving electrode 21 and the receiving electrode 22 to the touch IC 100.

The touch panel 20 may include an on-cell type touch panel on the display panel 10, an in-cell type touch panel within the pixels of the display panel 10, and an add-on type panel, which may be manufactured separately from the display panel 10 and then may be attached to an upper portion of the display panel 10. In other words, the touch panel 20 may be configured in various types and forms, and may be provided on the display panel 10 by various methods.

Hereinafter, the driving electrode 21 and receiving electrode 22 are collectively referred to as a "touch electrode." In other words, the touch panel 20 may include a plurality of touch electrodes, and the plurality of touch electrodes each may include a driving electrode 21 and a receiving electrode 22.

Next, a driving IC 200 may drive the display panel 10. For example, the driving IC 200 may include a gate driver 220 to apply a scan pulse to the gate lines GL1 to GLn in the display panel 10, a data driver 210 to apply a data voltage to the data lines DL1 to DLm in the display panel 10, and a timing controller 230 to control functions of the gate driver 220 and the data driver 210.

Although FIG. 1 illustrates the gate driver 220, the data driver 210, and the timing controller 230 in the driving IC 200 separately, each element of the driving IC 200 may be included in one chip, e.g., a display driver IC (DDI). Also, only the data driver 210 and timing controller 230 may be included in one chip DDI, and the gate driver 220 may be provided in the display panel 10 (e.g., a gate-driver-in-panel; "GIP").

Finally, the touch IC 100 may apply a driving pulse to the driving electrode 21, and then may detect whether or not the touch of the user has occurred on the touch panel 20 based on a touch signal received through the receiving electrode 22. For this purpose, the touch IC 100 may include an output unit 110 to output a driving pulse, e.g., on touch transmission lines Tx1 to Txn, and a receiving unit 120 to receive a touch signal, e.g., on touch reception lines Rx1 to Rxm.

With reference to FIG. 3, the touch panel 20 using the self-capacitive method may include a plurality of touch electrodes 25 and a plurality of touch electrode wirings 26 respectively connected to the plurality of touch electrodes 25, unlike that illustrated in FIG. 2. In this case, the touch IC 100 may supply a touch voltage to each of the touch electrode 25, and may detect whether or not the touch of the user has occurred based on a time when the touch voltage is decreased to a particular reference voltage.

In other words, the touch panel 20 according to embodiments may be configured as illustrated in the examples of FIGS. 2 and 3. The touch electrode to be described later may be the driving electrode 21 and the receiving electrode 22 illustrated in the FIG. 2 example, or may be the touch electrode 25 illustrated in the FIG. 3 example. For ease of explanation, the touch electrode in the touch panel 20 using the mutual capacitive method may be defined as an area in which the driving electrode 21 and the receiving electrode 22 intersect each other.

The display device 1 may further include a force sensor 30 to sense a force signal. For example, the force signal may be generated by the touch force of the user, and the touch force may refer to a force (e.g., pressure) to be applied to the display panel 10 upon the touch of the user. Accordingly, a pointer to sense the touch signal may be made of a conductive material, such as a finger, a pen, and the like, whereas a pointer to sense the force signal may be made of a non-conductive material, as well as a conductive material.

The force sensor 30 may include a plurality of force electrodes to sense a force signal. The plurality of force electrodes each may include a driving electrode 31 and a receiving electrode 32 in the display area A, and may include a driving electrode wiring Tx' and receiving electrode wirings Rx'1 to Rx'4 in the non-display area B. The driving electrode wiring Tx' and the receiving electrode wirings Rx'1 to Rx'4 may be provided in the non-display area B to connect the driving electrode 31 and the receiving electrode 32 to the touch IC 100.

The force signal may be sensed according to linear bending of the force sensor 30. For example, when the user applies a force to a cover glass at an uppermost portion of the display device 1, the force signal may be sensed by a pressure transmitted from the cover glass to the force sensor 30. Thus it may not be possible to accurately discern coordinates to which the touch force is applied.

Accordingly, the number of wirings of the force electrode may be smaller than that of the touch electrode. In other words, the wirings of the force electrode may be sparser than those of the touch electrode, and the wirings of the touch electrode may be denser to those of the force electrode.

In contrast, the force electrode may be the same as the touch electrode. In other words, the force sensor 30 and the touch panel 20 may share the same driving electrode and receiving electrode.

The touch IC 100 may sense whether the touch force of the user has occurred in the touch panel 20 based on a force signal received through the receiving electrode 32 after applying a driving pulse to the driving electrode 31. As such, the touch IC 100 may include an output unit 110' to output the driving pulse, and receiving units 120' to receive the force signal as shown in FIG. 4.

The force sensor 30 may be include a substrate including the force electrode, as illustrated in FIG. 1. Although FIG. 1 illustrates an example in which the force sensor 30 is between the display panel 10 and the touch panel 20, the force sensor 30 may be below the display panel 10, or may be between the touch electrodes in the touch panel 20. In other words, the force sensor 30 may be in any arbitrary area that may receive the force applied to the cover glass provided at the uppermost portion of the display device 1.

For example, when the force sensor 30 is between the touch electrodes in the touch panel 20, the driving electrode 31, and the receiving electrode 32 of the force sensor 30 may be the same as the driving electrode 21 and the receiving electrode 22 of the touch panel 20. In this case, to sense the touch force of the user, the touch IC may receive a force signal through the receiving electrode 22 after applying a driving pulse to the driving electrode 21 of the touch panel 20.

When the touch electrode and the force electrode share the same electrode, the touch IC 100 may drive the touch panel 20 and the force sensor 30 through the same electrode in a time-division manner. That is, the touch electrode and the force electrode may be defined by a function of sensing the touch and a function of sensing the touch force, respectively. Accordingly, physical configurations of the touch electrode and the force electrode may be the same, or may be different from each other.

A method in which the touch IC 100 senses the touch signal and the force signal using the touch electrode and the force electrode will be described in detail later.

Figure 5:
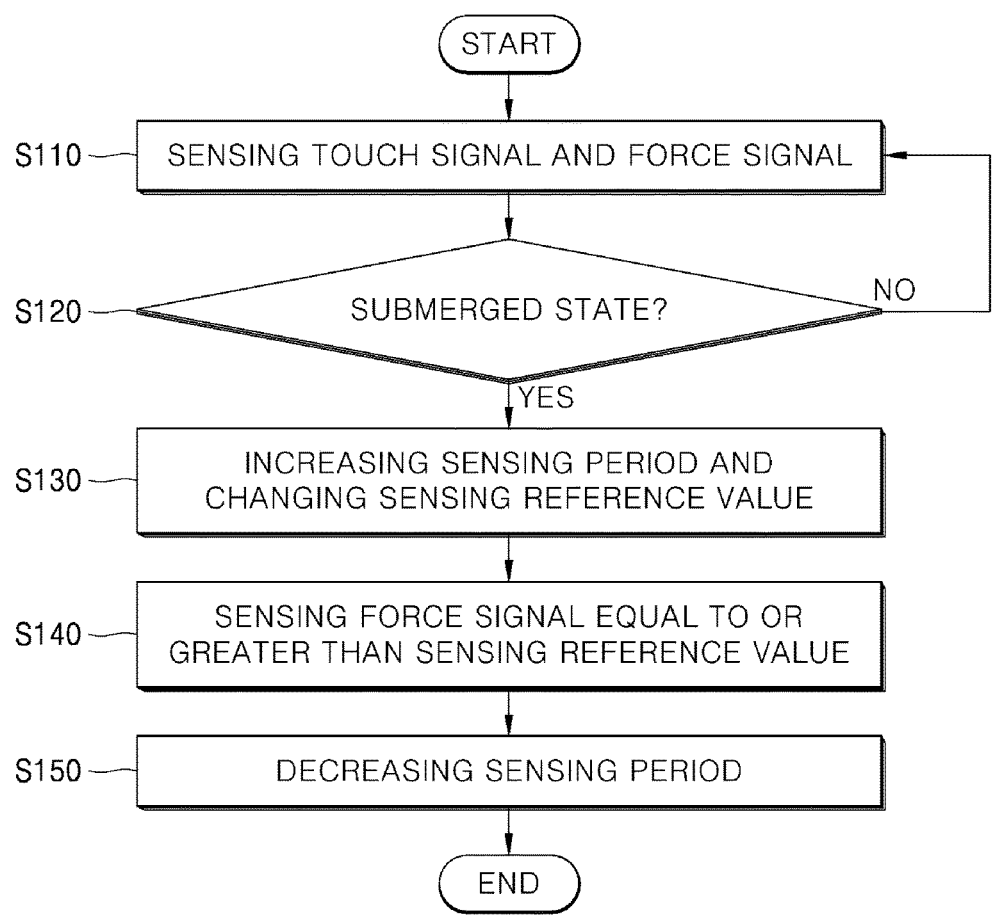
FIG. 5 is a flowchart illustrating a method of driving a display device according to an embodiment.
Figure 6:
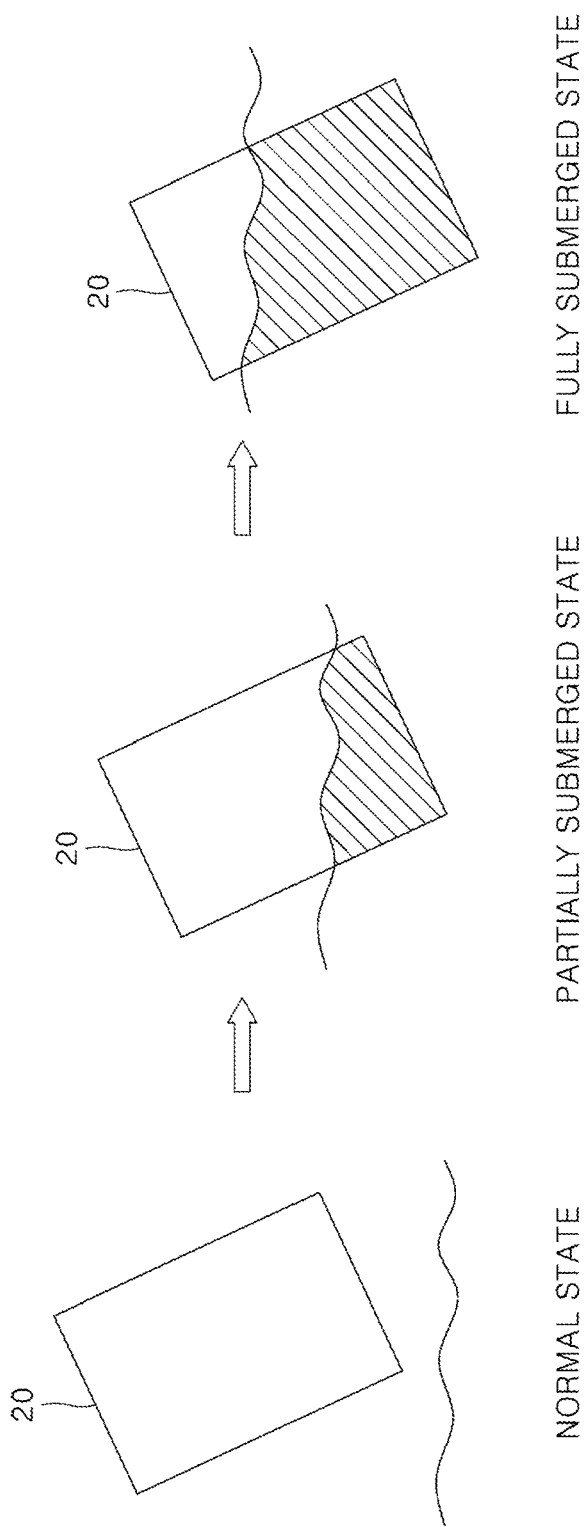
FIG. 6 illustrates a submerged state of a touch panel according to a submerged degree of the touch panel according to an embodiment.
Figure 7:
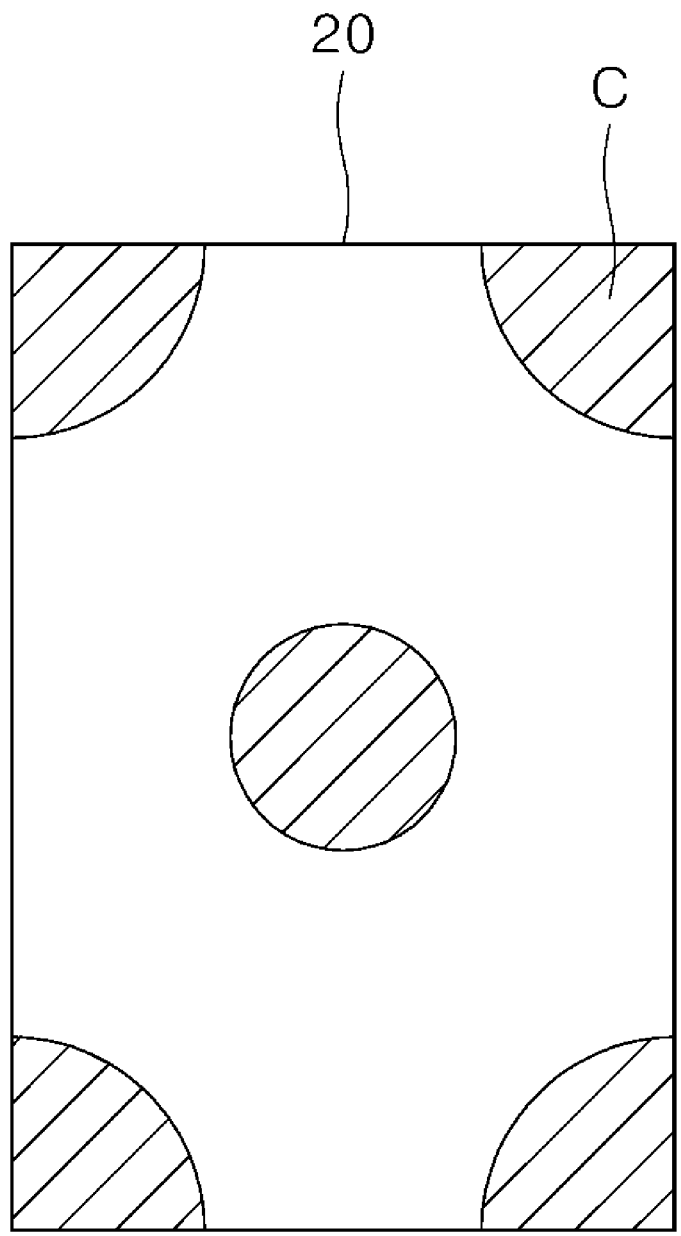
FIG. 7 illustrates areas of a touch panel set to determine a submerged state of the touch panel according to an embodiment.

FIG. 5 is a flowchart illustrating a method of driving a display device according to an embodiment. FIG. 6 illustrates a submerged state of a touch panel according to a submerged degree of the touch panel according to an embodiment. FIG. 7 illustrates areas of a touch panel set to determine a submerged state of the touch panel according to an embodiment.

Figure 8:
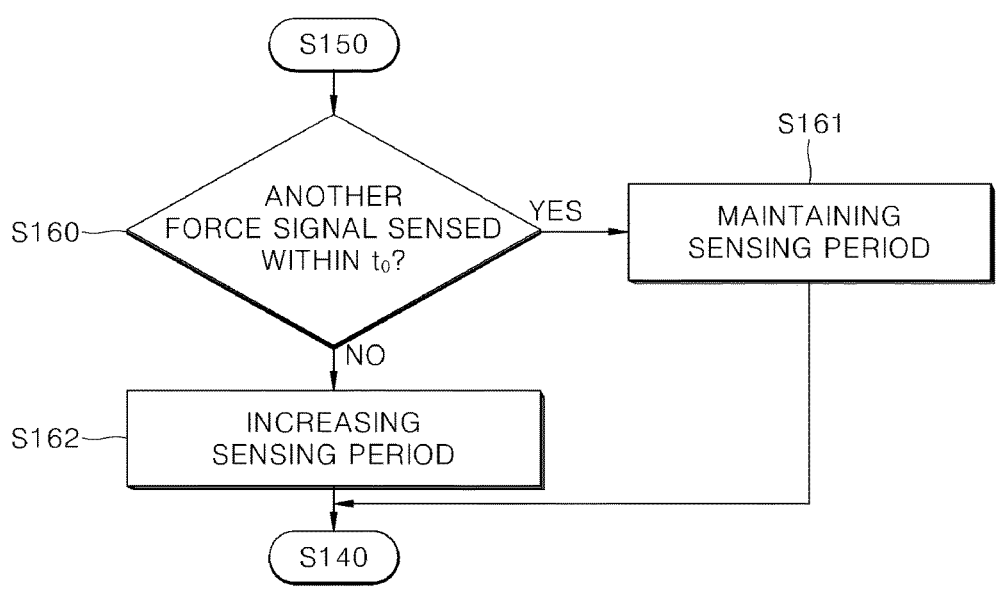
FIG. 8 is a flowchart illustrating a method of controlling a sensing period according to whether or not another force signal is sensed within a particular time after an arbitrary force signal is sensed on a touch panel in a submerged state according to an embodiment.
Figure 9:
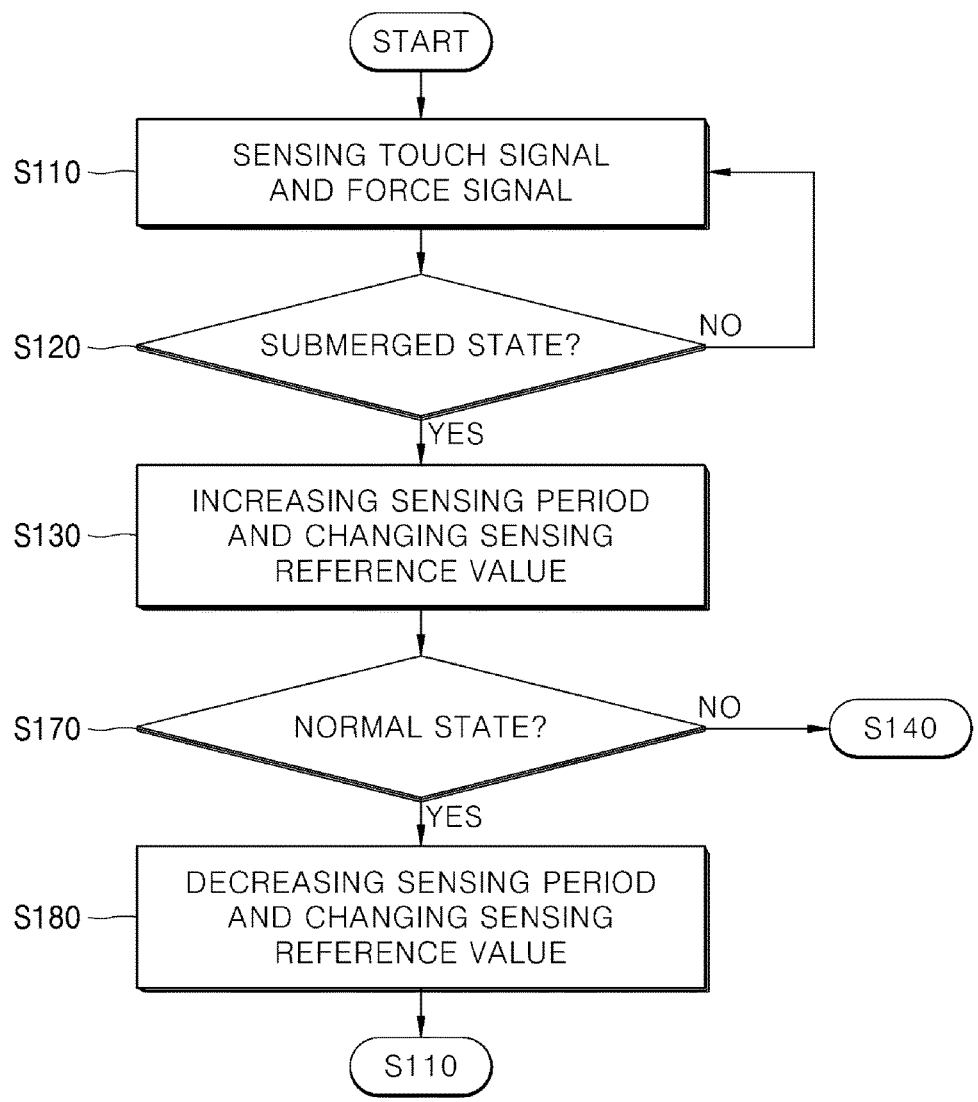
FIG. 9 is a flowchart illustrating a method of changing a sensing period and a sensing reference value of a force sensor depending on whether or not a touch panel in a submerged state is restored to the touch panel in a normal state according to an embodiment.

FIG. 8 is a flowchart illustrating a method of controlling a sensing period according to whether or not another force signal is sensed within a particular time after an arbitrary force signal is sensed on a touch panel in a submerged state according to an embodiment. FIG. 9 is a flowchart illustrating a method of changing a sensing period and a sensing reference value of a force sensor according to whether or not a touch panel in a submerged state is restored to the touch panel in a normal state according to an embodiment.

Figure 10:
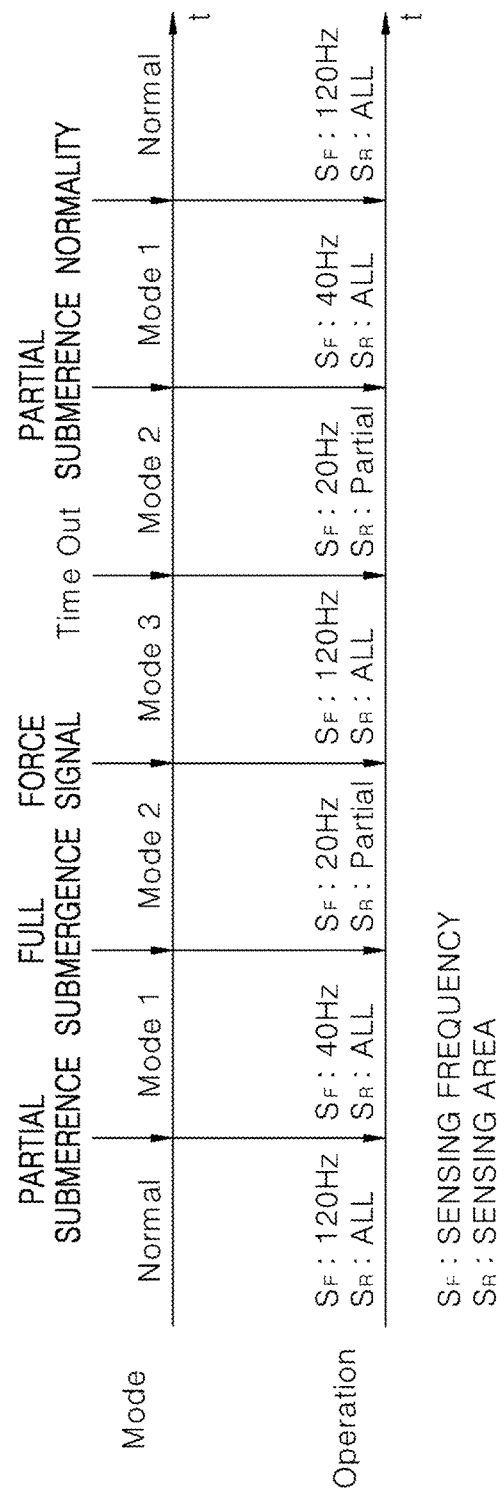
FIG. 10 illustrates operations of a touch panel and a force sensor according to a state of the touch panel according to an embodiment.
Figure 11:
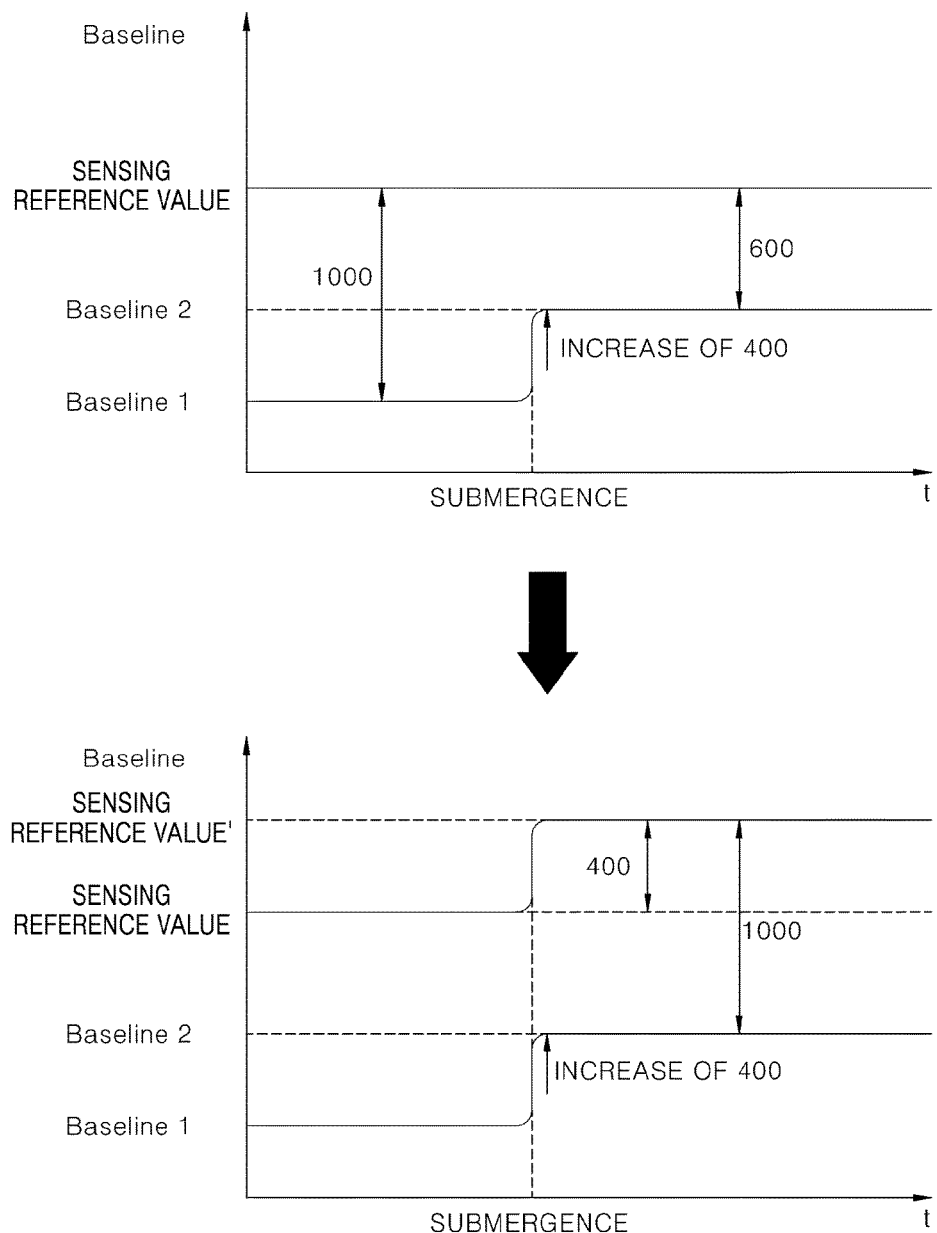
FIG. 11 is a graph illustrating a sensing reference value of a force sensor changed according to a baseline variation of the force sensor when a touch panel is submerged according to an embodiment.
Figure 12:
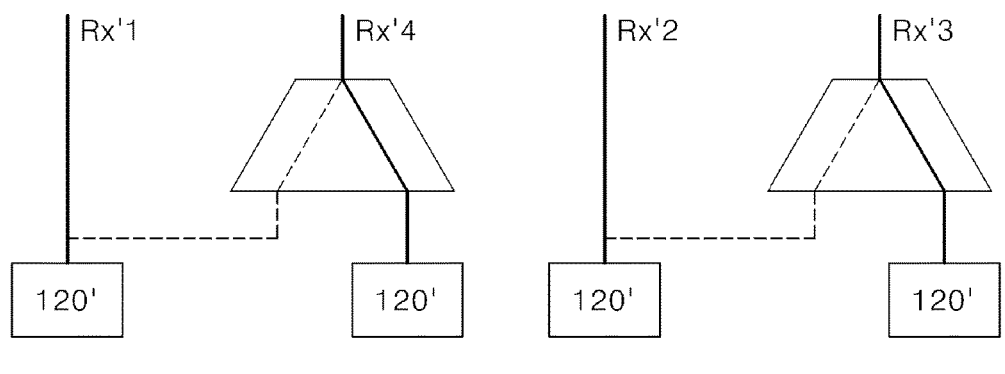
FIG. 12 illustrates a force signal sensed by grouping force electrodes illustrated in FIG. 4 according to an embodiment.
Figure 13:
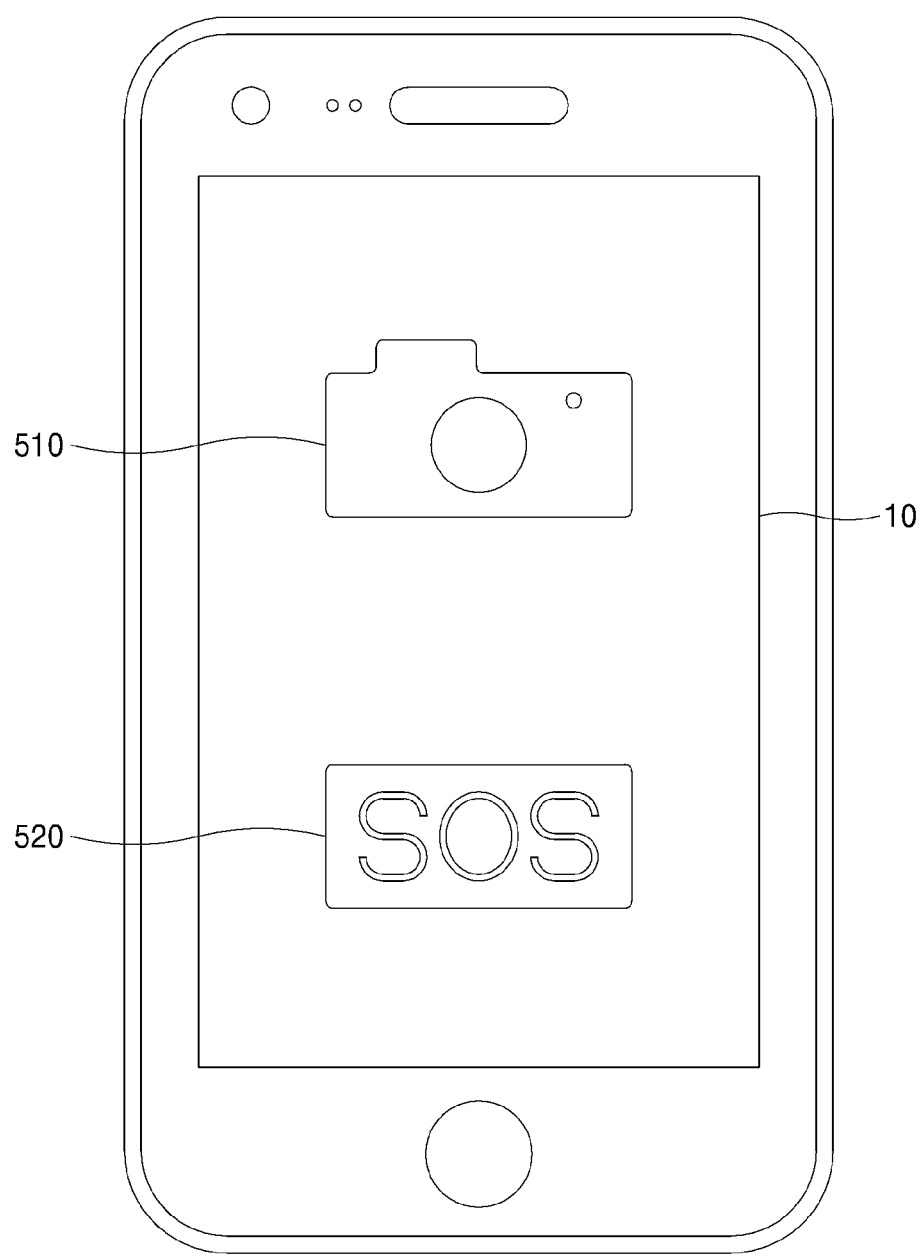
FIG. 13 illustrates an example of an interface displayed on a display panel when a touch panel is in a submerged state according to an embodiment.

FIG. 10 illustrates operations of a touch panel and a force sensor according to a state of the touch panel according to an embodiment. FIG. 11 is a graph illustrating a sensing reference value of a force sensor changed according to a baseline variation of the force sensor when a touch panel is submerged according to an embodiment. FIG. 12 illustrates a force signal sensed by grouping force electrodes illustrated in FIG. 4 according to an embodiment. FIG. 13 illustrates an example of an interface displayed on a display panel when a touch panel is in a submerged state according to an embodiment.

The method of driving a display device illustrated in FIG. 5 may be applied to the display device 1 described with reference to the examples of FIGS. 1 to 4, and may be performed by the touch IC 100.

Hereinafter, the method of driving a display device according to an embodiment will be described in detail with reference to FIGS. 5 to 13. First, the touch IC 100 may sense a touch signal from the plurality of touch electrodes constituting the touch panel 20, and may sense a force signal from the force sensor 30 (S110). The touch IC 100 may sense a touch signal from the touch electrode illustrated in the examples of FIGS. 2 and 3. The touch IC 100 may sense at least one of a capacitance variation of each touch electrode, and a voltage decreasing time of each touch electrode from the plurality of touch electrodes.

In the touch panel 20 illustrated in FIG. 2, the output unit 110 of the touch IC 100 may apply a driving pulse to the driving electrode 21. At a portion where the driving electrode 21 and the receiving electrode 22 intersect each other, a sensing signal may be induced to the receiving electrode 22 by the driving pulse applied to the driving electrode 21, and the sensing signal may be input to the receiving unit 120.

For example, the sensing signal may be a capacitance variation of the touch electrode. For example, in the touch panel 20 illustrated in FIG. 2, the sensing signal may be a variation of a mutual capacitance between the driving electrode 21 and the receiving electrode 22. In general, the mutual capacitance may be decreased when the touch of the user occurs, and the decreased capacitance may be a capacitance variation.

The touch IC 100 may sense the touch signal when the received capacitance variation is equal to or greater than a threshold value. In other words, the touch IC 100 may sense the touch signal only when the capacitance variation is equal to or greater than a particular threshold value. For example, a threshold value of the touch electrode may be a reference value of the user's touch for generating a touch signal. Accordingly, the touch IC 100 may sense the force signal only when a sensing signal generated by the touch force of the user is equal to or greater than the reference value.

In the touch panel 20 illustrated in FIG. 3, a sensing unit 130 of the touch IC 100 may apply a driving pulse to the touch electrode 25. The applied driving pulse may be converted into a sensing signal according to the user's touch, and the sensing signal may be input to the sensing unit 130. For example, the sensing signal may be a voltage decreasing time of the touch electrode 25. For example, the sensing signal in the touch panel 20 illustrated in FIG. 3 may be a time when a voltage of the touch electrode 25 is decreased. In general, the self-capacitance of the touch electrode 25 may be decreased when the user's touch occurs, which may lead to an increase in the time when the voltage applied to the touch electrode 25 by the drive pulse is decreased to a particular reference voltage.

The touch IC 100 may sense the touch signal when the received voltage decreasing time is equal to or greater than a threshold time. In other words, the touch IC 100 may sense the touch signal only when the voltage decreasing time is equal to or greater than a particular threshold time.

The touch IC 100 may sense at least one of a resistance value variation and a capacitance variation according to a pressure to be applied to the force sensor 30 from the force sensor 30. The force sensor 30 may have a constant thickness or a gap, and a size of the gap may vary according to a touch force to be applied to the force sensor 30. For example, the gap of the force sensor 30 may be decreased in line with an increase in the size of the touch force. Each force electrode may have a constant resistance value or capacitance according to the gap of the force sensor 30, and the resistance value and the capacitance may vary according to the size of the touch force, e.g., the size of the gap.

As described with reference to FIG. 4, the force sensor 30 may include a plurality of force electrodes. In this case, the touch IC 100 may sense at least one of a resistance value variation and a capacitance variation of each force electrode from the plurality of force electrodes.

In the touch panel 20 illustrated in FIG. 4, the output unit 110' of the touch IC 100 may apply a driving pulse to the driving electrode 31. A sensing signal may be induced to the receiving electrode 32 by the driving pulse applied to the driving electrode 31, and the sensing signal may be input to the receiving unit 120'.

The touch IC 100 may sense the force signal when the received resistance value variation is equal to or greater to the sensing reference value. In other words, the touch IC 100 may sense the force signal only when the resistance value variation is equal to or greater to a particular sensing reference value.

Also, the touch IC 100 may sense the force signal when the received capacitance variation is equal to or greater to the sensing reference value. In other words, the touch IC 100 may sense the force signal only when the capacitance variation is equal to or greater to the particular sensing reference value.

For example, the sensing reference value of the force sensor may be a reference value of the touch force of the user for generating a touch signal. Accordingly, the touch IC 100 may sense the force signal only when a sensing signal generated by the touch force of the user is equal to or greater than the reference value.

The sensing reference values may be set differently, depending on a type of the sensing signal. In other words, the sensing reference values for the resistance value variation and the capacitance variation may be set to be different from each other.

Although structures of the touch electrode and the force electrode have been described above with reference to the examples of FIGS. 2 to 4, the above-described structures are merely examples for ease of explanation, and the touch electrode and the force electrode may have any arbitrary structure for sensing the touch and touch force of the user. In other words, the touch electrode and the force electrode according to embodiments, which are elements defined by the function of sensing the touch and touch force of the user, may be configured according to various structures used in the relevant technical field. The touch electrode and the force electrode are not limited to the example embodiments illustrated in FIGS. 2 to 4.

The driving pulse to be applied to the touch electrode and the force electrode may have a constant frequency. In other words, the touch IC 100 may control a sensing period by applying the driving pulse with a certain frequency to the touch electrode and the force electrode. For example, the touch IC 100 may decrease the sensing period by increasing a frequency of the driving pulse, and may increase the sensing period by decreasing the frequency of the driving pulse.

The touch IC 100 may generate a drive pulse to be applied to the force electrode based on the drive pulse applied to the touch electrode. For this purpose, the touch IC 100 may include a level shifter and a phase shifter. In other words, the touch IC 100 may apply a drive pulse to the force electrode by shifting a level or a phase of the drive pulse applied to the touch electrode without generating a drive pulse to be applied to the force electrode.

Subsequently, the touch IC 100 may determine whether or not the touch panel 20 is in a submerged state, based on the sensed touch signal (S120). The submerged state may include a partially submerged state and a fully submerged state to be described later, and may be defined according to the submerged degree of the touch panel 20.

When the touch panel 20 is submerged, the capacitance variation of the touch electrode may be sensed to be equal to or greater than the threshold value. In other words, the touch signal may be sensed in the touch electrode positioned at the submerged portion of the touch panel 20. Accordingly, the touch IC 100 may determine how much the touch panel 20 is submerged based on the sensed touch signal. For example, the touch IC 100 may determine whether the touch panel 20 is in a submerged state based on a touch area defined by the sensed touch signal.

The touch area, which may be an area formed by the touch electrodes adjacent to each other, may be an area of the touch electrode where the touch signal is sensed. For example, in the touch panel 20 illustrated in FIG. 2, the touch electrode may be defined as areas where a plurality of driving electrodes and a plurality of receiving electrodes intersect each other. The touch area, which may be an area formed by the touch electrode where the touch signal is sensed, may be an area including a plurality of touch electrodes adjacent to each other. In the touch panel 20 illustrated in FIG. 3, the touch area, which may be an area formed by the touch electrode 25 where the touch signal is sensed, may be an area including the plurality of touch electrodes 25 adjacent to each other.

As described above, the touch signal may be sensed in the touch electrode positioned at the submerged portion of the touch panel 20. Thus, the touch area may be the same as the submerged area of the touch panel 20.

The touch IC 100 may determine that the touch panel 20 is in a submerged state when a ratio of the touch area to the touch panel 20 is equal to or greater than a particular ratio. With reference to FIG. 6, the particular ratio may include a first submergence ratio for determining a partially submerged state and a second submergence ratio for determining a fully submerged state. The first submergence ratio and the second submergence ratio each may be set to an arbitrary value by the user. For example, the first submergence ratio and the second submergence ratio may be set to 30% and 70%, respectively.

The touch IC 100 may compare the ratio of the touch area to the touch panel 20 with the first and second submergence ratios as the touch panel 20 in a normal state is submerged under water. When the ratio of the touch area to the touch panel 20 is 30% or more, the touch IC 100 may determine that the touch panel 20 is in a partially submerged state. When the ratio of the touch area to the touch panel 20 is 70% or more, the touch IC 100 may determine that the touch panel 20 is in a fully submerged state. Therefore, it may be possible to determine whether or not the touch panel is submerged according to a certain criterion such as a submergence ratio, regardless of a size of the display device 1 or the touch panel 20.

Unlike the preceding, the touch IC 100 may determine that the touch panel 20 is in a submerged state when a touch signal is sensed from a touch electrode included in a plurality of particular areas among the plurality of touch electrodes. For example, the touch IC 100 may determine whether or not the touch panel 20 is submerged based on whether or not the touch signal is sensed from the touch electrode included in the plurality of particular areas. The plurality of areas may be set by the user.

With reference to FIG. 7, a plurality of particular areas C may include four areas formed at vertex portions of the touch panel 20, and one area formed at a central portion of the touch panel 20. Although FIG. 7 illustrates the plurality of particular areas C in a shape of a circle or fan, the plurality of particular areas C may be configured in various shapes.

The touch IC 100 may determine that the touch panel 20 is in a partially submerged state when a touch signal is sensed from touch electrodes included in any two areas of the plurality of particular areas C. Further, the touch IC 100 may determine that the touch panel 20 is in a fully submerged state when a touch signal is sensed from touch electrodes included in any three areas of the plurality of particular areas C. Accordingly, it may be possible to determine whether or not the touch panel 20 is submerged even when the touch panel 20 is in local contact with the water. The number of areas for determining the partially submerged state and the fully submerged state may be arbitrarily set by the user.

Subsequently, when the touch panel 20 is determined to be in a submerged state, the touch IC 100 may increase the sensing periods of the touch signal and the force signal (S130). In general, the number of times that the user touches the touch panel 20 in a submerged state may be smaller than a number of times that the user touches the touch panel 20 in a normal (unsubmerged) state.

Accordingly, when the touch panel 20 determines that the touch panel 20 is submerged, the touch IC 100 may decrease the frequency of the driving pulse applied to the touch electrode and the force electrode, thereby increasing the sensing periods of the touch signal and the force signal. For example, the touch IC 100 may increase each of the sensing periods to a first period when the touch panel 20 is determined to be in a partially submerged state, and may increase the first period to a second period longer than the first period when the touch panel 20 is determined to be in a fully submerged state.

For example, the first period may be a period that is longer than a sensing period in a normal state. Accordingly, the touch IC 100 may gradually increase the length of the sensing periods as the touch panel 20 is submerged from a normal state to a fully submerged state, as illustrated in FIG. 6.

When the touch panel 20 is determined to be in a submerged state, the touch IC 100 may sense a touch signal and a force signal from a touch electrode and a force electrode corresponding to a partial area of the touch panel 20 among the plurality of touch electrodes and the plurality of force electrodes, respectively. In other words, the touch IC 100 may sense a touch signal and a force signal with respect to an entire area of the touch panel 20 when the touch panel 20 is in a normal state, and may decrease a sensing area that senses the touch signal and the force signal when the touch panel 20 is determined to be in a submerged state.

The sensing area may be set by the user when the touch panel 20 is in a submerged state. For example, as illustrated in the FIG. 7 example, the sensing area may be set as the vertex portions and the central portions of the touch panel 20.

Accordingly, when the touch panel 20 is submerged, only the touch electrode and the force electrode corresponding to the partial area of the touch panel 20 may be driven. Thus, it may be possible to reduce or prevent unnecessary power consumption in a situation in which the user's control over the display device 1 is restricted (for example, underwater).

With reference to FIG. 10, when the touch panel 20 is in a normal state, the touch IC 100 may apply a driving pulse having a sensing frequency SF of 120 Hz to touch electrodes and force electrodes included in all areas SR of the touch panel 20. When the touch panel 20 is determined to be in a partially submerged state (Mode 1), the touch IC 100 may apply a driving pulse having a sensing frequency SF of 40 Hz to the touch electrodes and the force electrodes included in the all areas SR of the touch panel 20. That is, when the touch panel 20 is in a partially submerged state, the touch IC 100 may sense an area the same as the area sensed when the touch panel 20 is in the normal state, but may decrease the sensing frequency SF, thereby increasing the sensing periods.

When the touch panel 20 is further submerged and the touch panel 20 is determined to be in a fully submerged state (Mode 2), the touch IC 100 may apply a driving pulse having a sensing frequency SF of 20 Hz to the touch electrode and the force electrode included in the partial area SR of the touch panel 20. That is, when the touch panel 20 is in a fully submerged state, the touch IC 100 may not only decrease the sensing area SR but also the sensing frequency SF, thereby increasing the sensing periods.

As described above, the display device 1 according to embodiments may control the sensing periods of the touch and the touch force depending on whether or not the touch panel is in a submerged state, thereby reducing or preventing unnecessary waste of power for sensing the touch and the touch force when the display device 1 is submerged.

When the touch panel 20 is determined to be in a submerged state, the touch IC 100 may detect a baseline variation of the force sensor, and may change the sensing reference value of the force sensor according to the detected baseline variation (S130). For example, the baseline may be a sensing signal sensed from the force sensor in the absence of a touch force on the touch panel 20.

In general, the baseline may be increased by water pressure when the touch panel 20 is in a submerged state as compared to when in a normal state. In other words, the sensing signal sensed from the force sensor in the absence of the touch force may be higher when the touch panel 20 is in a submerged state than in a normal state. The touch IC 100 may detect a baseline variation by calculating a difference value between the baseline of the force sensor in a normal state and the baseline of the force sensor in a submerged state.

When the baseline variation is detected, the touch IC 100 may extract a sensing reference value variation corresponding to the baseline variation with reference to a lookup table stored in a memory (not illustrated). In the lookup table, information on the sensing reference value variation according to the baseline variation may be stored in a form of a table. The information on the sensing reference value variation according to the baseline variation may be set based on a value measured by the experiment. Accordingly, the touch IC 100 may extract the sensing reference value variation corresponding to the detected baseline variation, and may change the sensing reference value variation of the force sensor according to the extracted sensing reference value variation.

The sensing signal sensed by the touch force of the user may have an increased value from the baseline, and the touch IC 100 may sense the force signal based on a difference value between the sensing signal and the baseline. However, when the baseline increases in a submerged state, the difference value between the sensing signal and the baseline may be decreased in comparison to a normal state, so that the force signal sensed in a normal state may not be sensed in a submerged state. Accordingly, the touch IC 100 may increase the sensing reference value in a normal state by the sensing reference value variation according to the baseline variation when the baseline increases. In addition, when the touch panel 20 is determined to be in a submerged state, the touch IC 100 may change the sensing reference value by the baseline variation.

The sensing reference value and the baseline may be defined in the same unit. For example, the sensing reference value and the baseline, which may be each set for a particular sensing signal, may be defined in a unit corresponding to each sensing signal. Accordingly, the touch IC 100 may detect the baseline variation, and then may change the sensing reference value by the baseline variation.

With reference to FIG. 11, a Baseline 2 in a submerged state may rise 400 more than a Baseline 1 in a normal state. Accordingly, a difference value between the sensing reference value and the baseline may be decreased by 400 when in the submerged state as compared to when in the normal state.

As described above, when the difference value between the sensing reference value and the baseline is decreased, the force signal sensed in a normal state may not be sensed in a submerged state. To reduce or prevent this situation, when the touch panel 20 is submerged, the touch IC 100 may subtract the Baseline 1 in a normal state from the Baseline 2 in a submerged state to detect a baseline variation of 400, and may increase an existing sensing reference value of the force electrode by the baseline variation (by 400). As such, the difference value between the sensing reference value and the baseline when in the normal state may be maintained, even when in the submerged state. As described above, the display device 1 according to embodiments may change the sensing reference value of the force sensor when the touch panel 20 is submerged, thereby maintaining the normal sensitivity for sensing the touch force even when the display device 1 is submerged.

Subsequently, the touch IC 100 may sense a force signal equal to or greater than the changed sensing reference value through the force sensor according the increased sensing periods (S140). The sensing periods may be controlled according to the frequency of the driving pulse to be applied to the touch electrode and the force electrode as described above. In addition, the method of sensing the force signal equal to or greater than the changed sensing reference value is substantially similar to the method described in operation S110, and therefore a detailed description will be omitted.

For example, the touch IC 100 may group a plurality of force electrodes into at least one force group, and may sense a force signal equal to or greater than the changed sensing reference value through any one force group of the grouped force groups. For example, with reference to FIG. 4, the touch IC 100 may apply a driving pulse to the force electrode through the driving electrode 31. A force electrode positioned at an upper left portion of the touch panel 20 may provide a sensing signal to the touch IC 100 through the receiving electrode wiring of Rx'1, and a force electrode positioned at a lower left portion of the touch panel 20 may provide a sensing signal to the touch IC 100 through the receiving electrode wiring of Rx'2. A force electrode positioned at an upper right portion of the touch panel 20 may provide a sensing signal to the touch IC 100 through the receiving electrode wiring of Rx'4, and a force electrode positioned at a lower right portion of the touch panel 20 may provide a sensing signal to the touch IC 100 through the receiving electrode wiring of Rx'3.

Accordingly, in a normal state, the touch IC 100 illustrated in FIG. 4 may detect a position (an upper left portion, a lower left portion, an upper right portion, and a lower right portion) where the touch force of the user is made depending on which the receiving electrode wiring is used to sense the force signal.

With reference to FIG. 12, in a submerged state, the touch IC 100 may group a plurality of force electrodes positioned at the upper left portion and upper right portion of the touch panel 20 into any one force group, and may group a plurality of force electrodes positioned at the lower left portion and lower right portion into another force group. That is, the touch IC 100 may group a force electrode located at an upper portion of the touch panel 20 and a force electrode at a lower portion of the touch panel 20 into different force groups.

For this purpose, a multiplexer (MUX) may be connected to any one of the receiving electrode wirings of Rx'1 and Rx'4 and any one of the receiving electrode wirings of Rx'2 and Rx'3.

In a normal state, the touch IC 100 may control an output line of the multiplexer so that a sensing signal received through the respective receiving electrode wirings Rx'1, Rx'2, Rx'3 and Rx'4 may be input to respective receiving units 120'. On the other hand, in a submerged state, the touch IC 100 may control the output line of the multiplexer so that a sensing signal received through the receiving electrode wirings of Rx'1 and Rx'4 positioned at the upper portion of the touch panel 20 may be input to any one of the receiving units 120', and so that a sensing signal received through the receiving electrode wirings of Rx'2 and Rx'3 positioned at the lower portion of the touch panel 20 may be input to another one of the receiving units 120'.

FIG. 12 illustrates an example in which the touch IC 100 groups the force electrodes positioned at the upper and lower portions of the touch panel 20 into different force groups, but the touch IC 100 may group force electrodes positioned in any arbitrary area of the touch panel 20 into a force group.

As described above, when the touch panel 20 is submerged, the areas of the touch panel 20 may be grouped to receive the touch force of the user. Thus, it may be possible to react to an incorrect touch force occurring when the user controls the display device 1 under water.

Subsequently, the touch IC 100 may decrease the sensing periods of the touch signal and the force signal when the force signal equal to or greater than the changed sensing reference value is sensed through the force sensor (S150). For example, the touch IC 100 may again decrease the increased sensing periods when the force signal equal to or greater than the sensing reference value is sensed by the touch force of the user.

With reference to FIG. 10, when the touch panel 20 is in a fully submerged state (Mode 2) and the force signal is sensed, the touch IC 100 may again apply a drive pulse having a sensing frequency SF of 120 Hz to the touch electrodes and the force electrodes included in the all areas SR of the touch panel 20 (Mode 3). In other words, when the force signal is sensed in the fully submerged state, the touch IC 100 may decrease the increased sensing periods again by increasing the frequency of the driving pulse. As described above, the display device 1 according to embodiments may decrease the sensing periods of the touch and the touch force when the touch force of the user is applied to the submerged touch panel, thereby rapidly responding to the touch or the touch force of the user.

After the sensing periods of the touch signal and the force signal are decreased by the force signal sensed in a fully submerged state, the touch IC 100 may increase the sensing periods when another force signal is not sensed for a particular length of time. For example, with reference to FIG. 8, the touch IC 100 may decrease the sensing periods in operation S150, and then may check whether another force signal is sensed within a particular time t0 (S160). When another force signal is sensed, the touch IC 100 may maintain the current sensing periods (S161). On the other hand, when another force signal is not sensed, the touch IC 100 may increase the sensing periods again (S162).

With reference to FIG. 10, when a force signal is sensed and then another force signal is not sensed within the particular time t0 (Time Out), the touch IC 100 may apply a driving pulse having a sensing frequency SF of 20 Hz to the touch electrode and the force electrode included in the partial area SR of the touch panel 20. In other words, when a force signal is sensed and then another force signal is not sensed within the particular time t0 (Time Out) in a fully submerged state, the touch IC 100 may decrease the frequency of the driving pulse to increase the decreased sensing periods again.

Accordingly, when a touch force that is not intended by the user is applied to the submerged touch panel 20 (e.g., when another force signal is not sensed for a certain period of time after a force signal is sensed), the sensing periods of the touch and the touch force may be increased again, thereby reducing or preventing an unnecessary waste of power for sensing the touch and the touch force.

When the touch panel 20 is determined to be in a normal state, the touch IC 100 may decrease the sensing periods of the touch signal and the force signal, may detect the baseline variation of the force sensor, and may change the sensing reference value of the force sensor according to the detected baseline variation. For example, with reference to FIG. 9, the touch IC 100 may determine whether or not the touch panel 20 is in a normal state after performing operations S110 to S130 illustrated in FIG. 5 (S170).

The touch IC 100 may determine that the touch panel 20 is in a normal state when the ratio of the touch area defined by the sensed touch signal is less than the particular ratio. Also, the touch IC 100 may determine that the touch panel 20 is in a normal state when a touch signal is not sensed from a touch electrode included in the plurality of particular areas among the plurality of touch electrodes. That is, the method in which the touch IC 100 determines that the touch panel 20 is in a normal state may be performed in a manner substantially opposite to the method in which the touch IC 100 determines that the touch panel 20 is in a submerged state described with reference to FIGS. 5 to 7, and therefore a detailed description of method of determining the state of the touch panel 20 will be omitted.

When the touch panel 20 is determined to remain in a submerged state, that is, to be not in a normal state, the touch IC 100 may perform operation S140. On the other hand, when the touch panel 20 is determined to be in a normal state, the touch IC 100 may decrease the sensing periods again, and may change the sensing reference value of the force sensor according to the baseline variation of the force sensor (S180).

With reference to to FIG. 10, as the touch panel 20 is moved out of the water, the touch panel 20 in a fully submerged state may be determined as a normal state by way of a partially submerged state. For example, the touch IC 100 may decrease the sensing periods again by increasing the frequency of the driving pulse to be applied to the touch electrode and the force electrode.

With reference to FIG. 11, when the touch panel 20 is moved out of the water, the water pressure applied to the touch panel 20 may be removed. Thus, the baseline may be decreased again. Accordingly, the touch IC 100 may be detect the baseline variation, and may change the sensing reference value according to the detected baseline variation. The method of changing the sensing reference value according to the baseline variation has been described above with reference to operation S130, and therefore, a detailed description thereof will be omitted. Accordingly, even when the display device 1 is submerged under water and then moved from the water, it may be possible to maintain the normal sensitivity for sensing the touch force.

With reference to FIG. 1, when the touch IC 100 determines that the touch panel 20 is in the submerged state, the driving IC 200 may apply a voltage to the gate line and the data line so that the interface is displayed on the display panel 10. In general, the user's control over the display device 1 under water may be restricted. Accordingly, when the touch panel 20 is determined to be in a submerged state, the driving IC 200 may display only the interface on the display panel 10.

With reference to FIG. 13, in one example, an interface displayed on the display panel 10 may include a camera icon 510 and an emergency relief icon (SOS) 520. The interface may be set or selected by the user.

The processor 300 may execute an application corresponding to the interface when a force signal equal to or greater than the sensing reference value is sensed from the force sensor 30 corresponding to an area where the interface is displayed. The processor 300 may receive a force signal by a touch force applied to the area where the interface is displayed from the touch IC 100. The processor 300 may execute an application corresponding to an interface at a position where the touch force is applied with reference to the memory (not illustrated) of the display device 1.

In FIG. 13, when a touch force is applied to an area where the camera icon 510 is displayed, the processor 300 may execute an application that performs a photographing operation using a camera built in the display device 1. Also, in FIG. 13, when a touch force is applied to an area where the emergency relief icon 520 is displayed, the processor 300 may execute a communication application to transmit a signal for help to a particular address (e.g., a telephone number, an e-mail address, a SMS address, and the like).

As described with reference to the examples of FIGS. 4 and 12, the touch IC 100 may group the plurality of force electrodes constituting the force sensor 30 into at least one force group. For example, the driving IC 200 may apply a voltage to the gate line and the data line so that the interface is displayed in a force area defined by the force group. The force area defined by the force group may be an area corresponding to the receiving electrode 32 of the force sensor 30.

In one example, the touch IC 100 may group the plurality of force electrodes illustrated in FIG. 4 into a force area (an upper left portion) corresponding to the receiving electrode wiring of Rx'1, a force area (a lower left portion) corresponding to the receiving electrode wiring of Rx'2, a force area (a lower right portion) corresponding to the receiving electrode wiring of Rx'3, and a force area (an upper right portion) corresponding to the receiving electrode wiring of Rx'4. For example, the area defined by the force group may be a total of four areas, i.e., the upper left portion, the lower left portion, the upper right portion, and the lower right portion. The driving IC may apply a voltage to the gate line and the data line so that the interface is displayed in each of the four grouped force areas.

In another example, as described with reference to FIG. 12, the touch IC 100 may group the plurality of force electrodes illustrated in FIG. 4 into a force area (an upper portion) corresponding to the receiving electrode wirings of Rx'1 and Rx'4 and a force area (a lower portion) corresponding to the receiving electrode wirings of Rx'2 and Rx'3. For example, the area defined by the force group may be a total of two areas, e.g., the upper portion and the lower portion.

The driving IC may apply a voltage to the gate line and the data line so that the interface is displayed in each of the two grouped force areas. In other words, when the area defined by the force group includes upper and lower portions, as illustrated in FIG. 12, the interface may be displayed as illustrated in FIG. 13.

The interface may be displayed in the force area defined by the force group, so that the number of the interfaces may not exceed the number of force groups. That is, the touch force applied to an arbitrary area may be sensed by any one of the force groups, and the maximum number of the interfaces may be the same as the number of the force groups.

As described above, the display device 1 according to embodiments may perform a particular operation according to the user's input, even when the touch panel is submerged, thereby performing various operations when the user uses the display device under water. The display device 1 according to embodiments may execute a particular application according to a touch force input from the user, even when the touch panel 20 is submerged, and thus it may be possible to perform a touch sensing operation.

It will be apparent to those skilled in the art that various modifications and variations may be made in the present disclosure without departing from the technical idea or scope of the disclosure. Thus, it may be intended that embodiments of the present disclosure cover the modifications and variations of the disclosure provided they come within the scope of the appended claims and their equivalents.

What is claimed is:
1. A method of driving a display device, the method comprising:
   sensing a touch signal from a plurality of touch electrodes in a touch panel;
   sensing a force signal from a force sensor;
   based on the sensed touch signal, determining whether or not the touch panel is in a submerged state;
   when the touch panel is determined to be in the submerged state, increasing sensing periods of the touch signal and the force signal;
   detecting a baseline variation of the force sensor;
   based on the detected baseline variation, changing a sensing reference value of the force sensor;
   based on the increasing the sensing periods, sensing the force signal equal to or greater to the changed sensing reference value through the force sensor; and
   when the force signal equal to or greater to the changed sensing reference value is sensed through the force sensor, decreasing the sensing periods.

2. The method of claim 1, wherein the sensing a touch signal from a plurality of touch electrodes in the touch panel and the sensing a force signal from a force sensor comprises sensing the force signal from a plurality of force electrodes in the force sensor.

3. The method of claim 2, further comprising sensing the touch signal and the force signal from a touch electrode and a force electrode corresponding to a partial area of the touch panel among the plurality of touch electrodes and the plurality of force electrodes when the touch panel is determined to be in the submerged state, respectively.

4. The method of claim 2, wherein the sensing the force signal equal to or greater to the changed sensing reference value according to the increased sensing periods through the force sensor comprises:
   grouping the plurality of force electrodes into at least one force group; and
   sensing a force signal equal to or greater to the changed sensing reference value through any one force group among the grouped force groups.

5. The method of claim 1, wherein the sensing a touch signal from a plurality of touch electrodes in the touch panel and sensing a force signal from a force sensor comprises sensing at least one of: a capacitance variation of each touch electrode and a voltage decreasing time of each touch electrode, among the plurality of touch electrodes.

6. The method of claim 1, wherein the sensing a touch signal from a plurality of touch electrodes in the touch panel and the sensing a force signal from a force sensor comprises sensing at least one of: a resistance value variation and a capacitance variation, according to a pressure to be applied to the force sensor from the force sensor.

7. The method of claim 1, wherein the determining whether or not the touch panel is in a submerged state based on the sensed touch signal comprises determining whether or not the touch panel is in a submerged state based on a touch area defined by the sensed touch signal.

8. The method of claim 7, wherein, in the determining whether or not the touch panel is in a submerged state based on a touch area defined by the sensed touch signal, the touch panel is determined to be in a submerged state when a ratio of sizes of the touch area to the touch panel is equal to or greater than a particular ratio.

9. The method of claim 1, wherein, in the determining whether or not the touch panel is in a submerged state based on the sensed touch signal, the touch panel is determined to be in a submerged state when the touch signal is sensed from a touch electrode included in a plurality of particular areas among the plurality of touch electrodes.

10. The method of claim 1, wherein the increasing sensing periods of the touch signal and the force signal when the touch panel is determined to be in the submerged state comprises:

when the touch panel is determined to be in a partially submerged state, increasing each of the sensing periods to a first period; and when the touch panel is determined to be a fully submerged state, increasing each of the sensing periods to a second period longer than the first period.

11. The method of claim 1, wherein the detecting a baseline variation of the force sensor when the touch panel is determined to be in the submerged state and the changing a sensing reference value of the force sensor according to the detected baseline variation comprises:

extracting a sensing reference value variation corresponding to the detected baseline variation with reference to a lookup table; and changing a sensing reference value of the force sensor according to the extracted sensing reference value variation.

12. The method of claim 1, wherein the detecting a baseline variation of the force sensor when the touch panel is determined to be in the submerged state and the changing a sensing reference value of the force sensor according to the detected baseline variation comprises changing a sensing reference value of the force sensor by the detected baseline variation.

13. The method of claim 1, further comprising increasing sensing periods of the touch signal and the force signal again when another force signal is not sensed for a particular time after a sensing period of the force signal is decreased.

14. The method of claim 1, further comprising:

after the touch panel is determined to be in the submerged state, determining whether or not the touch panel is in a normal state based on the sensed touch signal; and when the touch panel is determined to be in a normal state, decreasing sensing periods of the touch signal and the force signal;

detecting a baseline variation of the force sensor; and changing a sensing reference value of the force sensor according to the detected baseline variation.

15. A display device, comprising:

a display panel comprising a plurality of pixels, each pixel being in an area where a gate line and a data line intersect each other;

a touch panel comprising a plurality of touch electrodes, each configured to sense a touch signal;

a force sensor configured to sense a force signal;

a driving integrated circuit (IC) configured to drive the display panel; and a touch IC configured to:

determine whether or not the touch panel is in a submerged state, based on the touch signal received from the touch panel;

when the touch panel is in a submerged state, increase sensing periods of the touch signal and the force signal;

detect a baseline variation of the force sensor;

change a sensing reference value of the force sensor based on the detected baseline variation; and when the force signal equal to or greater than the changed sensing reference value is sensed, decrease the sensing periods.

16. The display device of claim 15, wherein the force sensor comprises a plurality of force electrodes, each configured to sense the force signal.

17. The display device of claim 16, wherein:

the touch IC is further configured to group the plurality of force electrodes into at least one force group; and the driving IC is further configured to apply a voltage to the gate line and the data line so that a interface is displayed in a force area defined by the force group.

18. The display device of claim 15, wherein the driving IC is further configured to apply a voltage to the gate line and the data line so that a interface is displayed on the display panel when the touch panel is determined to be in a submerged state.

19. The display device of claim 18, further comprising a processor configured to execute an application corresponding to the interface when a force signal equal to or greater than the changed sensing reference value is sensed from a force sensor corresponding to an area where the interface is displayed.

* * * * *